United States Patent [19]

Kawai et al.

[11] Patent Number: 4,902,039
[45] Date of Patent: Feb. 20, 1990

[54] PASSIVE SEAT BELT SYSTEM

[75] Inventors: Osamu Kawai; Shunzi Mizumura, both of Fujisawa, Japan

[73] Assignee: Nippon Seiko Kabushiki Kaisha, Tokyo, Japan

[21] Appl. No.: 94,451

[22] Filed: Sep. 9, 1987

[30] Foreign Application Priority Data

Sep. 11, 1986 [JP] Japan ................. 61-212783

[51] Int. Cl.⁴ ............................................ B60R 22/38
[52] U.S. Cl. ................................... 280/802; 180/268
[58] Field of Search ............... 280/801, 804, 802, 803, 280/806, 807, 805; 297/474, 479; 180/268, 269

[56] References Cited

U.S. PATENT DOCUMENTS

| 3,822,760 | 7/1974 | Lindblad | 280/804 |
| 4,561,677 | 12/1985 | Kawai | 280/804 |
| 4,708,365 | 11/1987 | Nakano et al. | 280/804 |

FOREIGN PATENT DOCUMENTS

| 50-117519 | 9/1975 | Japan . |
| 50-117520 | 9/1975 | Japan . |
| 50-117521 | 9/1975 | Japan . |
| 54-9766 | 4/1979 | Japan . |
| 54-39341 | 4/1979 | Japan . |

Primary Examiner—Richard A. Bertsch
Attorney, Agent, or Firm—Shapiro and Shapiro

[57] ABSTRACT

A passive seat belt system for automatic fastening or unfastening of a seat belt in response to the boarding and exiting of a seat occupant has an overload for detector for detecting the presence of an overload in the movement of a movable anchor of the seat belt, and a controller adapted for stopping a motor for moving said movable anchor in response to the detection of an overload in the movement of the movable anchor.

44 Claims, 20 Drawing Sheets

Fig. 13A
Fig. 13B
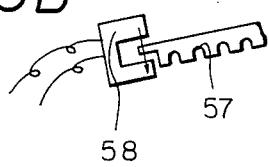
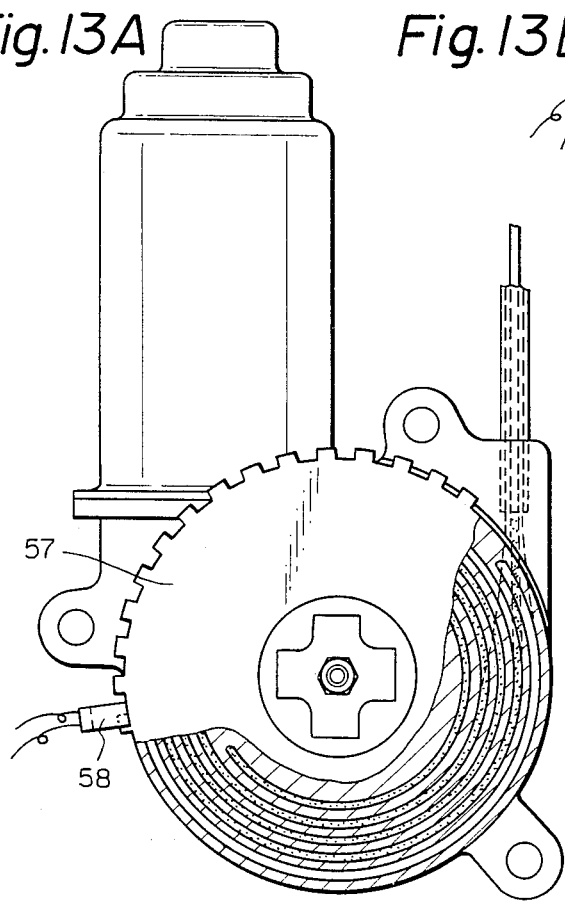
Fig. 14
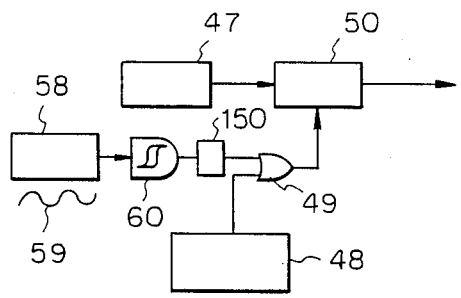

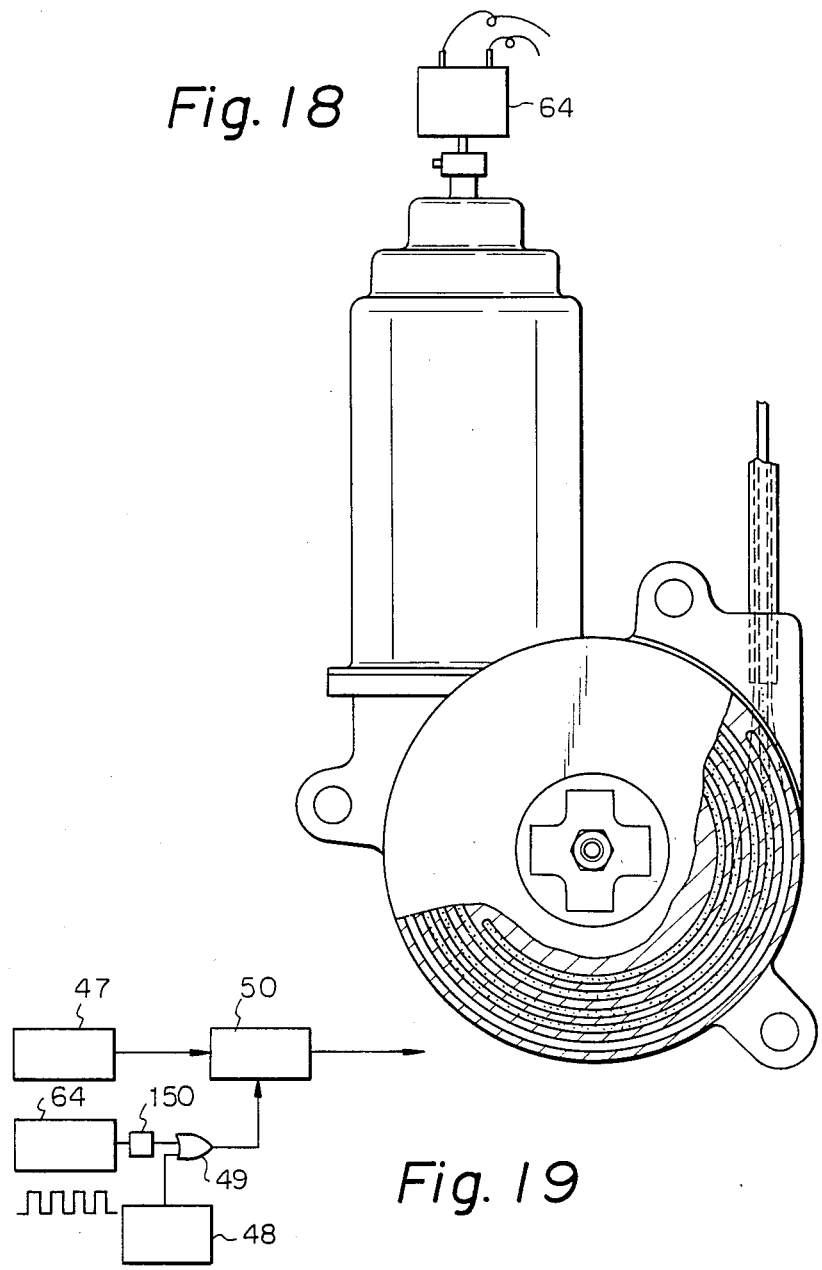

Fig. 20A
Fig. 20B
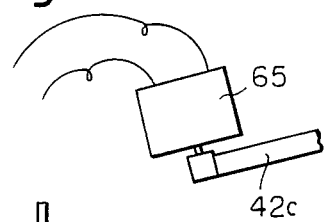
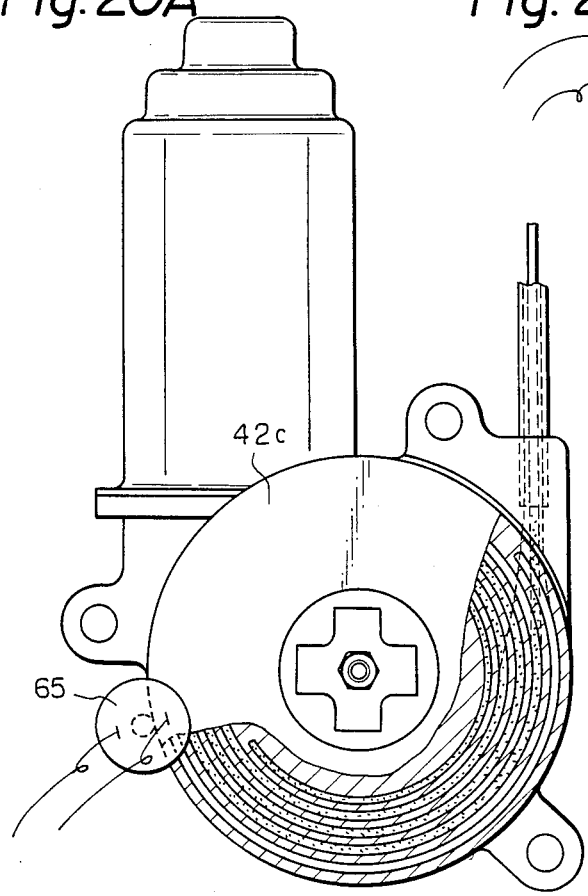
Fig. 21
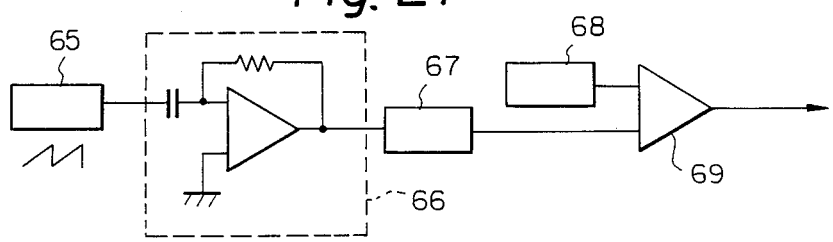

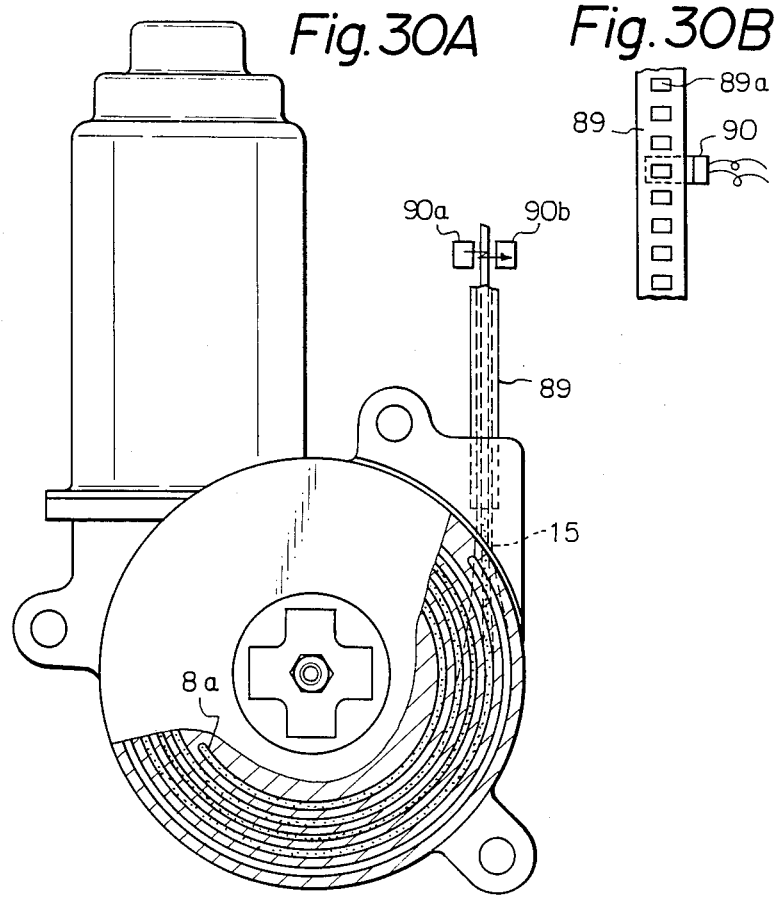
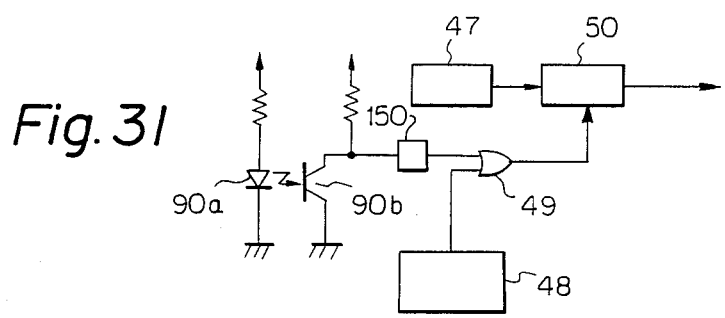

PASSIVE SEAT BELT SYSTEM

BACKGROUND OF THE INVENTION

1. Field of the Invention

The present invention relates to a passive seat belt system for automatic fastening/unfastening of seat belt in response to the boarding or alighting of a vehicle occupant, and, more particularly, to a passive seat belt system capable of preventing an overload state of a motor for driving a movable anchor of the seat belt.

2. Related Background Art

In a passive seat belt system in which the seat belt is fastened or unfastened by reciprocating an anchor, attached to said seat belt, by a driving motor between the front end (unfastened state) of a guide rail and the rear end (fastened state) thereof, the anchor may collide with the head, hand or finger of the vechicle occupant during the anchor movement. Since such collision is annoying, it becomes necessary to immediately interrupt or reverse the movement of the anchor. Also, because a locked rotor current continues to flow in the motor in such state, it is necessary to discontinue such unnecessary current to protect the motor itself.

For this reason, in a system proposed for example in the U.S. Pat. No. 3,822,760, an actuator member provided on the motor actuates a normally open switch in the overload state of the motor to control the rotation thereof, but the above-mentioned problems have not been satisfactorily resolved.

Also, a passive seat belt system for controlling the motor output in response to a change in the ambient temperature is disclosed in the U.S. Pat. No. 4,561,677, and system for controlling the motor output in response to the detection of an obstacle are disclosed in the Japanese Patent Publication No. 9766/1979 and in the Japanese Utility Model Registration Laid-open Publication Nos. 117520/1975, 117519/1975, 117521/1975 and 39341/1975, but these systems are still insufficient for overload detection.

The overload detection means of the present invention will be explained by an example of a passive seat belt system in which the anchor moving time is monitored by a timer, and such system is disclosed for example in the Japanese patent application Ser. No. 29034/1986 of the present applicant.

OBJECT OF THE INVENTION

It is an object of the present invention to resolve the above-mentioned drawbacks in the prior technology.

It is another object of the present invention to provide a passive seat belt system capable of detecting the overload in the movement of the anchor.

It is still another object of the present invention to provide a passive seat belt system capable of controlling a motor by detecting the overload in the movement of the anchor.

SUMMARY OF THE INVENTION

The present invention, developed to resolve the above-mentioned drawbacks of the prior technology, provides a passive seat belt system for automatic fastening/unfastening of the seat belt in response to the boarding or alighting of an occupant, comprising overload detection means for detecting an overload in the movement of a movable anchor of said seat belt, and control means for stopping a motor for driving said movable anchor when said detection means detects an overload in the movement of said movable anchor.

BRIEF DESCRIPTION OF THE DRAWINGS

FIG. 13A is a partially cut-away external view of a principal portion of an eleventh embodiment;

FIG. 13B is a partial plan view of a principal portion of said embodiment;

FIG. 14 is a circuit diagram of an overload detecting circuit of said embodiment;

FIG. 18 is a partially cut-away external view of a principal portion of a fourteenth embodiment;

FIG. 19 is a circuit diagram of an overload detecting circuit of said embodiment;

FIG. 20A is a partially cut-away external view of a principal portion of a fifteenth embodiment;

FIG. 20B is a partial plan view of a principal portion of said embodiment;

FIG. 21 is a circuit diagram of an overload detecting circuit of said embodiment;

FIG. 30A is a partially cut-away external view of a principal portion of a twentieth embodiment;

FIG. 30B is an enlarged view, seen from another angle, of a principal portion of said embodiment;

FIG. 31 is a circuit diagram of an overload detecting circuit of said embodiment.

DETAILED DESCRIPTION OF THE PREFERRED EMBODIMENTS

Now the present invention will be described in detail by explanation of the embodiments thereof shown in the attached drawings.

Figure 1:
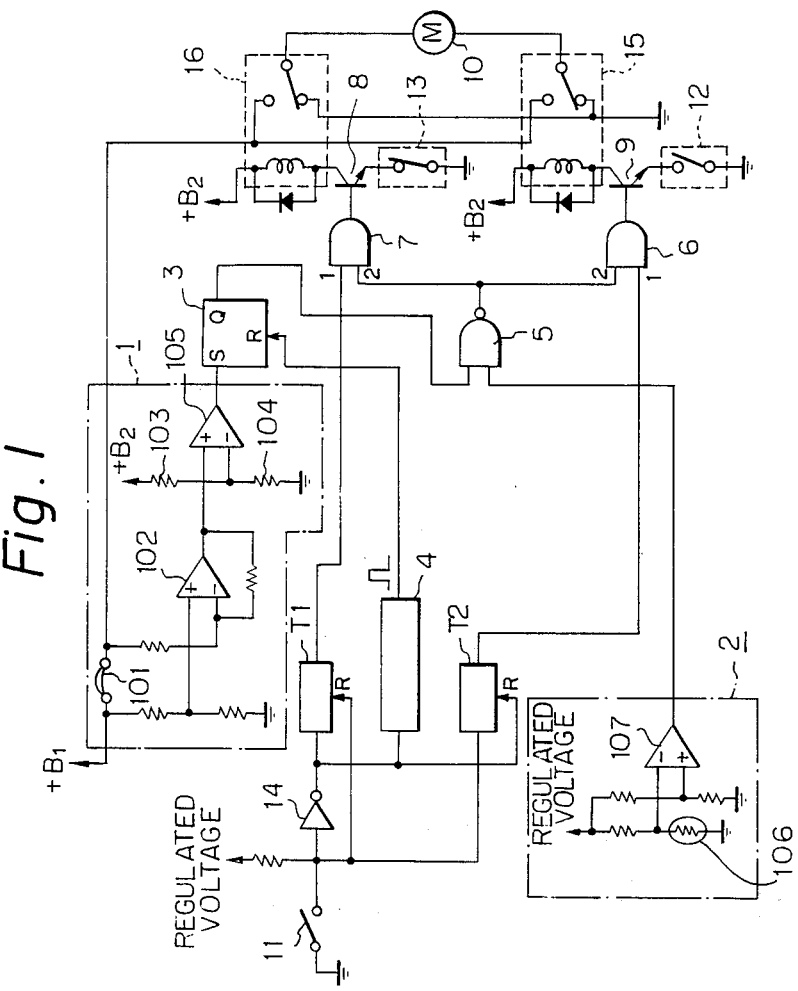
FIGS. 1 to 6 are circuit diagrams respectively showing first to sixth embodiments of the present invention.

FIG. 1 illustrates a system constituting a first embodiment of the present invention.

In FIG. 1 there are shown an overcurrent detecting circuit 1 to be explained later, and an ambient temperature detecting circuit 2. In a normal state, the overcurrent detecting circuit provides a zero output, so that a flip-flop 3, which is connected to said overcurrent detecting circuit also has a zero output. Flip-flop 3 is reset at each door opening/closing by a door opening/closing detection circuit 4 for releasing a reset pulse upon detection of a door opening/closing. Also in said normal state, the ambient temperature detecting circuit 2 provides an output "1". Thus a NAND gate 5, receiving the outputs of said flip-flop 3 and said ambient temperature detecting circuit, provides an output "1" which is supplied to input terminals 2 of two AND gates 6, 7, thereby transmitting the outputs of timers T1, T2, supplied to the other input terminals 1 of said gates 6, 7, to driving transistors 8, 9 for a motor 10.

In the following there will be briefly explained the function of the passive seat belt system of the present invention in such normal state.

A door switch 11, turned on or off in the opened or closed state of the door, is grounded at an end and is connected, at the other end, to an inverter 14 and timers T1, T2. A rear switch 12 turned on or off according to whether the anchor of the seat belt is at the rear end, and a front switch 13 turned on or off according to whether said anchor is at the front end, are respectively connected to the emitters of the transistors 8, 9. The output inverter 14 is connected to the timers T1, T2 and the door opening/closing detection circuit 4, as shown. The timer T1 monitors the moving time of the forward movement of the anchor when the door is opened, while the timer T2 monitors the moving time of the backward movement of the anchor when the door is closed.

In the following there will be explained the function of the timer T2 only, as both timers function in the same manner.

In response to an input signal "1", the timer T2 produces an output "1" for a predetermined period and an output "0" thereafter, and, in response to an input signal "0", said timer always produces an output "0". Also when a control terminal R is at "1" level, the output is always "0" regardless of the input signal.

Thus, during the backward motion of the anchor from the front end, the timer T2 produces a corresponding output for a predetermined period, and, if the anchor does not reach the rear end, the timer T2 expires to turn off the transistor 9, thereby turning off a relay 15 to interrupt the drive current for the motor 10. On the other hand, if the anchor reaches the rear end within the predetermined period, limit switch 12 is turned off to interrupt the drive current for the motor.

In FIG. 1, reference numbers 15 and 16 indicate relay circuits, and +B1 and +B2 are both batteries. The circuit of the battery +B1, involving a large current, shows a large voltage drop due to the resistance in the circuit from the battery to the motor, so that the battery +B2 is provided separately for the purpose of determining the power supply voltage and varying a set value accordingly.

In the following there will be explained the overload detecting circuit 1, composed of an overcurrent detecting circuit for detecting the motor current. Said overcurrent detecting circuit is composed of converter means for converting the motor current into a voltage, set value determining means for determining the set value according to the power supply voltage, and comparator means for comparing the voltage from said converter means with the voltage from said set value determining means and releasing an overload signal when the former exceeds the latter.

In the illustrated embodiment, the converter means is composed of a circuit breaker 101 which is provided in a circuit for current supply to the motor and which converts the motor current into a terminal voltage across said circuit breaker. The voltage thus obtained is amplified by an amplifier 102. The set value determining means is composed of resistors 103, 104 connected to the power source +B2. The comparator means is composed of a comparator 105.

The junction point of the resistors 103, 104 is connected to the negative input terminal of the comparator 105, which generates an output signal indicating an overload state when a voltage, larger than a set value appearing at said junction point, is supplied to the positive terminal of the comparator 105. Said signal is supplied to the flip-flop 3, which maintains its state until next opening/closing of the door.

In the following there will be explained the ambient temperature detecting circuit 2. In said circuit two sets of bleeder resistors are connected to the same power supply, and the voltage-dividing points of said bleeder resistors are respectively connected to positive and negative input terminals of an operational amplifier 107. A thermistor 106 with a negative temperature coefficient is used as a grounded bleeder resistor connected to the negative input terminal. Consequently, this detecting circuit provides a zero output when the ambient temperature is below a predetermined value. In this state the NAND gate 5 always provides an output "1", so that the output of the overcurrent detecting circuit 1 is disregarded by the NAND gate 5 and does not affect the function of the AND gates 6, 7. Thus the motor control by the overload detecting circuit is disabled.

At a low temperature, the motion of the anchor becomes slower, so that a significant load is applied to the motor even in the normal operation. Therefore, even in the normal operation without any obstacle to the anchor motion, an overload state may be identified to trigger the motor control. The above-explained ambient temperature detecting circuit is provided for preventing such erroneous operation.

Figure 2:
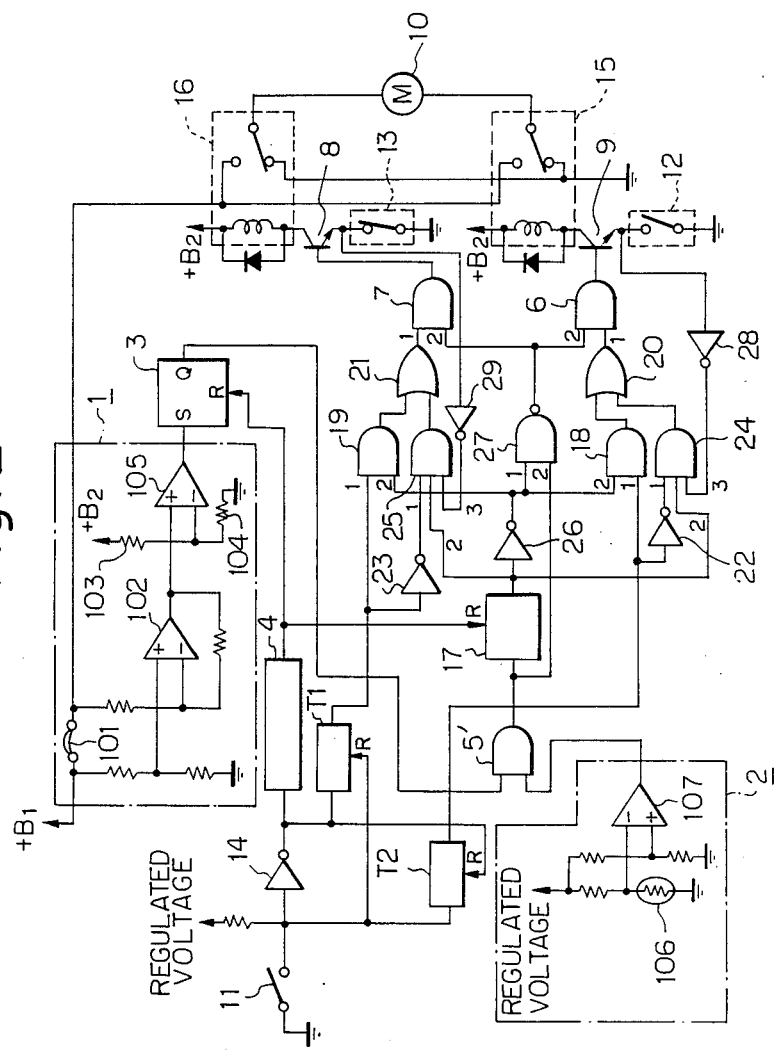

FIG. 2 illustrates a second embodiment of the present invention, wherein like components as those in FIG. 1 are represented by the same numbers.

In this embodiment, upon detection of an overload of the motor by the overload detecting means, the motor is reversed and is thereafter stopped. For this purpose a reversing timer 17, which is reset by the door opening/closing detection circuit 4 at each opening or closing of the door, reverses the motor for a period determined by said timer after the detection of an overload state by the overload detecting means, and the motor is stopped thereafter.

In the normal state, as will be more fully explained later, the AND gates 18, 19 and the AND gates 6, 7 are opened (output state 1) by input signals "1" to the input terminals 2 thereof to transmit the outputs of the timers T1 and T2 to the motor driver.

In an overload state, the overload detecting circuit 1 generates an output whereby the flip-flop 3 releases an output signal "1". It is assumed that the ambient temperature detecting circuit 2 releases an output signal "1". Thus an AND gate 5' connected to said flip-flop 3 releases an output signal "1" to activate a reversing timer 17 connected thereto. During the operation of said timer, it provides an output signal "1", whereby an inverter 26, connected thereto, supplies a zero output signal to close two AND gates 19, 18 (output state zero). The outputs of said AND gates 19, 18 are supplied respectively to OR gates 21, 20, the outputs of which are supplied respectively to inputs 1 of AND gates 7, 6.

On the other hand, the output of the reversing timer 17 is supplied to input terminals 2 of three-input AND gates 24, 25.

The input terminals 1 of said AND gates 24, 25, being connected respectively to the timers T1, T2 through inverters 22, 23, receive signals opposite to the states of said timers T1, T2 (namely, said signal being "0" or "1" respectively when the timer is on or off). The input terminal 3 is assumed to receive a signal "1", as will be explained later.

Thus, when the reversing timer 17 supplies a signal "1" to the input terminals 2 of the AND gates 24, 25, in a state after to the activation of the overload detecting circuit 1, the motor is reversed. For example, when overload occurs in a state of forward motion of the anchor through the activation of the timer T1, the motor is reversed to return the seat belt toward the rear end. In particular the output of the turned-off timer T2 is transmitted, as a signal "1" through the inverter 22, to the input terminal 1 of the AND gate 24 to reverse the motor through the OR gate 20 and AND gate 6, as the input terminal 2 of AND gate 6 is connected to the NAND gate 27 which releases a signal "1" during the activation of the reversing timer 17.

When the reversing timer 17 is subsequently turned off, the inverter 26 supplies the input terminal 1 of the NAND gate 27 with a signal "1". The input terminal 2 of NAND gate 27, connected to the AND gate 5', receives a signal "1" in an overload state, so that the output of the NAND gate 27 is shifted to zero, thereby closing the AND gates 6, 7 and terminating the current supply to the motor.

The input terminals 3 of the AND gates 24, 25 are respectively connected, through inverters 28, 29, to the ungrounded ends of the rear switch 12 and the front switch 13. These circuits close the AND gates 24, 25 to prohibit the above-explained reverse rotation of the motor when the anchor reaches the rear end or the front end, thereby preventing erroneous overload identification.

Figure 3:
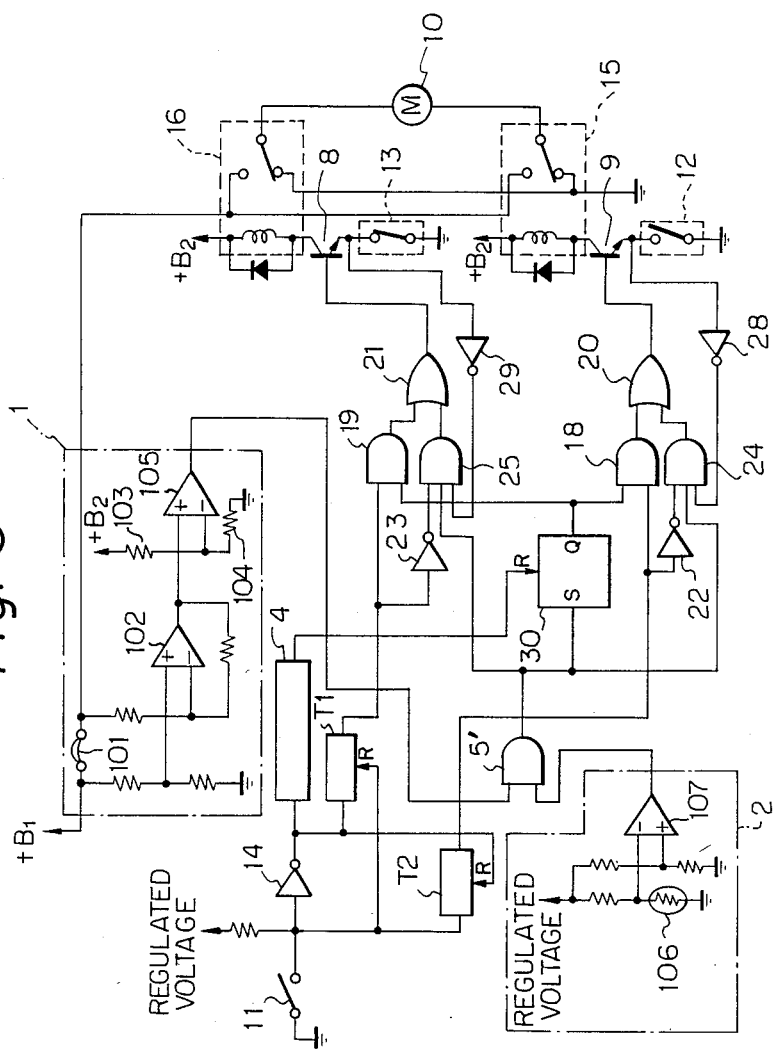

FIG. 3 shows third embodiment of the present invention, wherein like components to those in FIG. 1 or 2 are represented by like numbers. In this embodiment, the motor is reversed in response to the detection of an overload state of the motor by the overload detecting circuit 1, and the motor is stopped when said circuit identifies that said overload state has been terminated.

The present embodiment is different from the foregoing second embodiment in that the output of the overload detecting circuit 1 is not retained by a flip-flop but is directly supplied an AND gate 5'. Consequently, when the overload state is resolved and the output of the detecting circuit 1 is shifted to the low level, the AND gate 5' is closed (output state zero).

A flip-flop 30, provided at the output side of the AND gate 5' and reset by the door opening/closing detection circuit 4 at each opening or closing of the door, provides the AND gates 18, 19 with a zero signal when the AND gate 5' is opened, thereby closing said AND gates 18, 19 and interrupting the current supply to the motor, and retains said signal level until the next door opening or closing. At the same time the output of the AND gate 5' is also supplied to the AND gates 24, 25 to reverse the rotation of the motor in the same manner as in the second embodiment.

If the overload state of the motor is resolved during reverse rotation thereof, the AND gate 5' is closed to close the AND gates 24, 25 thereby terminating the reverse rotation of the motor.

Figure 4:
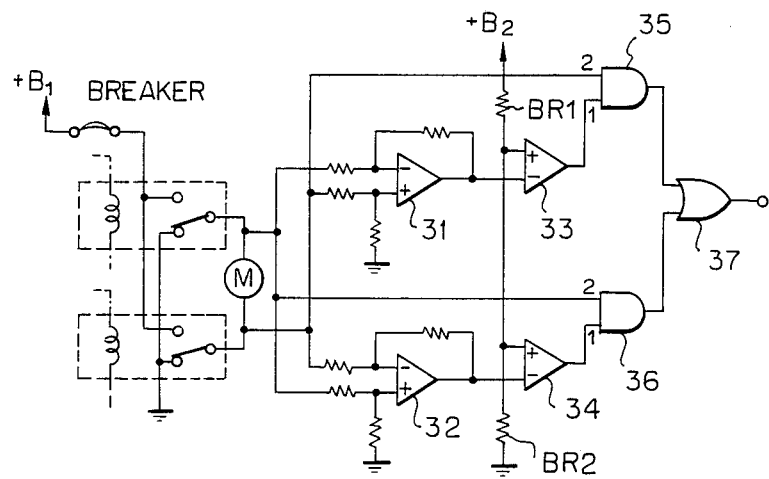

FIG. 4 shows another embodiment of the overload detecting circuit in the foregoing embodiments.

In this circuit, in the aforementioned converter means, the motor current is obtained by the voltage across the motor.

Operational amplifiers 31, 32 receive the terminal voltage of the motor respectively in opposite polarities, to convert said terminal voltage into voltages measured from ground, which are supplied to the negative input terminals of comparators 33, 34 for comparison with set values supplied to the positive input terminals (said set value being determined by bleeder resistors BR1, BR2 and variable according to the power supply voltage +B2). Input terminals 1 of AND gates 35, 36 are connected respectively to the outputs of the comparators 33, 34, while input terminals 2 thereof are respectively connected to terminals across the motor, and said AND gates provide the output of the comparators 33 or 34 to an OR gate 37, in response to the forward or reverse rotation of the motor.

Figure 5:
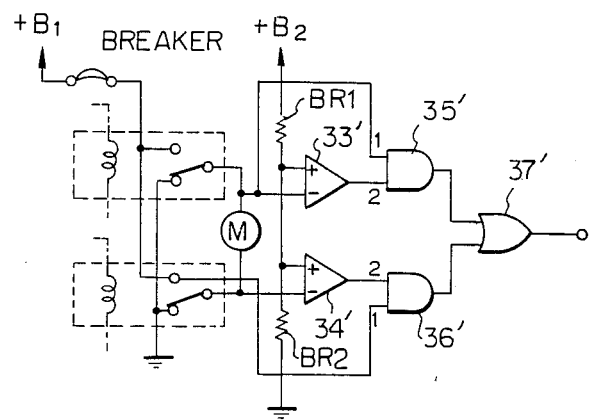

FIG. 5 shows another embodiment of the overload detecting circuit.

In said circuit, a variation of the voltage drop in the circuit from the power source to the motor terminal, in response to the motor current, is utilized for the purposes of the aforementioned converter means.

The voltages across the motor are respectively supplied to the negative input terminals of comparators 33', 34', of which positive input terminals receive a voltage obtained by dividing the power supply voltage +B2 with bleeder resistors BR1, BR2. The outputs of said comparators 33', 34' are respectively connected to input terminals 2 of AND gates 35', 36' of which the other input terminals 1 are respectively connected to the terminals across the motor. The outputs of said AND gates 35', 36' are connected to an OR gate 37'.

In the course of motor function with such a polarity that the motor terminal connected to the input terminal 1 of the AND gate 35' is positive, if the negative input to the comparator 33' becomes smaller than the set value due to an overload, said comparator releases a signal "1" to open the AND gate 35', thereby releasing an overload signal.

If the motor terminal connected to the input terminal 1 of the AND gate 36' is positive, an overload signal is released through the OR gate 37' when the amplifier 34' is turned on.

Figure 6:
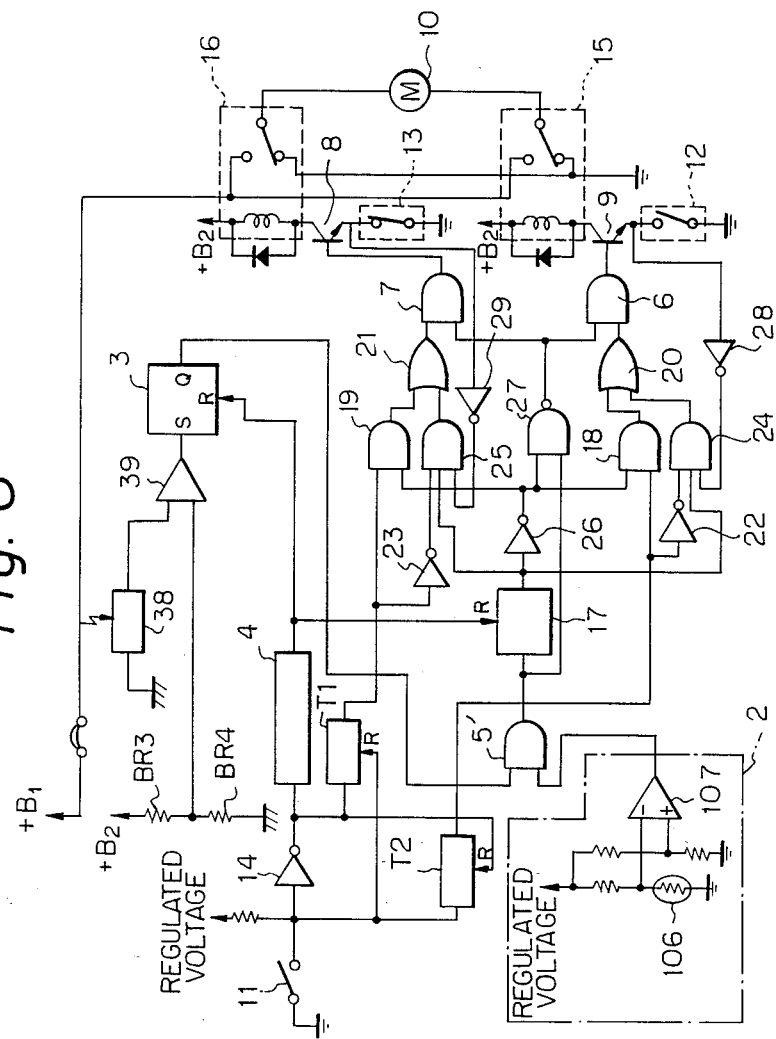

FIG. 6 shows still another embodiment of the overload detecting circuit, wherein like components to those in FIG. 2 are represented by the same numbers.

In this circuit, the aforementioned converter means is composed of a Hall element 38, positioned close to the power supply circuit for the motor, for detecting the motor current.

More specifically the output voltage of the Hall element is compared, by a comparator 39, with a set voltage, appearing at the junction point of bleeder resistors BR3, BR4 connected to the power source +B2 and being variable according to the power source voltage +B2, and, if the former is higher, the flip-flop 3 releases an overload signal.

The rest of the operation of the FIG. 6 embodiment is the same as in the FIG. 2 embodiment and will therefore not be described in detail.

Figure 7:
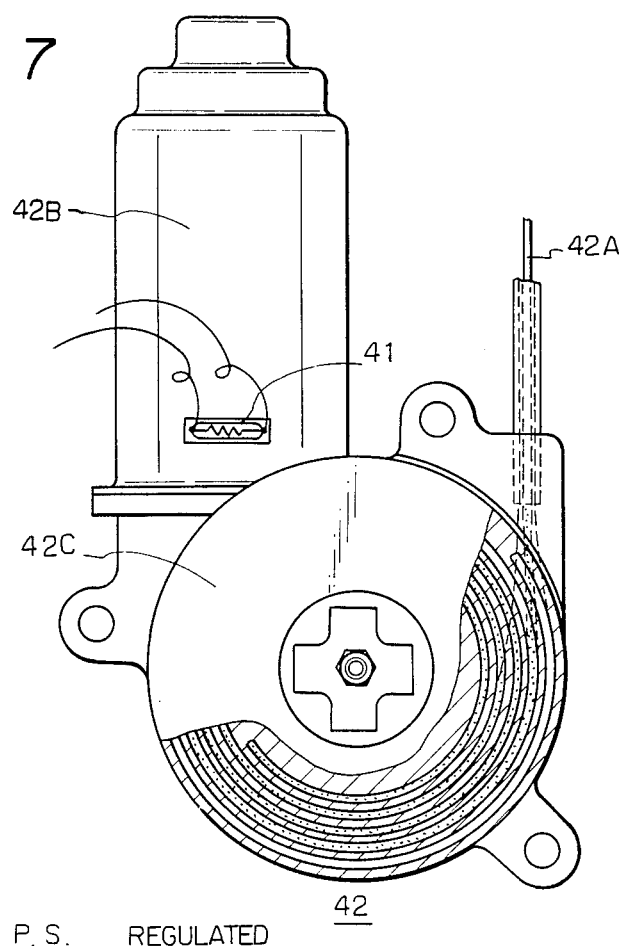
FIG. 7 is a partially cut-off external view of a principal portion of a seventh embodiment.
Figure 8:
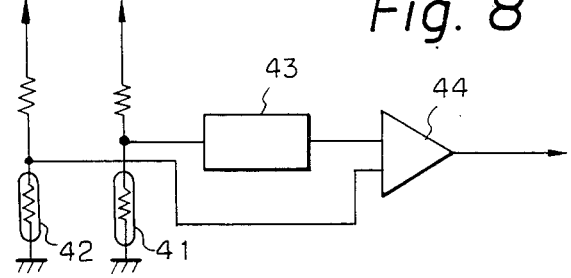
FIG. 8 is a circuit diagram of an overload detecting circuit of said embodiment.

FIGS. 7 and 8 illustrate still another embodiment of the overload detecting circuit.

In this case the overload detecting means is composed of temperature rise rate detecting means for detecting the temperature rise rate of the motor and identifying an overload when the temperature rise rate exceeds a set value.

Said detecting means is composed of a thermistor with a negative temperature coefficient.

A thermistor 41 for detecting the temperature rise of the motor is mounted, as shown in FIG. 7, to a yoke 42B of the motor of a winding device 42 for an anchor driving member 42A. A thermistor 42 is provided in order that the set value for the temperature rise rate is variable according to the temperature detected by the aforementioned ambient temperature detecting circuit, and also according to the power supply voltage.

The voltage detected by the thermistor 41 mounted on the motor yoke is supplied, through a differentiating circuit 43, to an input terminal of a comparator 44, which compares said voltage with a set voltage given by the thermistor 42 of the ambient temperature detecting circuit and identifies an overload if the former exceeds said set voltage.

The following discussion will address; embodiments in which the overload detecting circuit is provided with rotation detecting means for detecting the revolution or speed of the motor and identifying an overload if said revolution or speed becomes lower than a set value.

Figure 9:
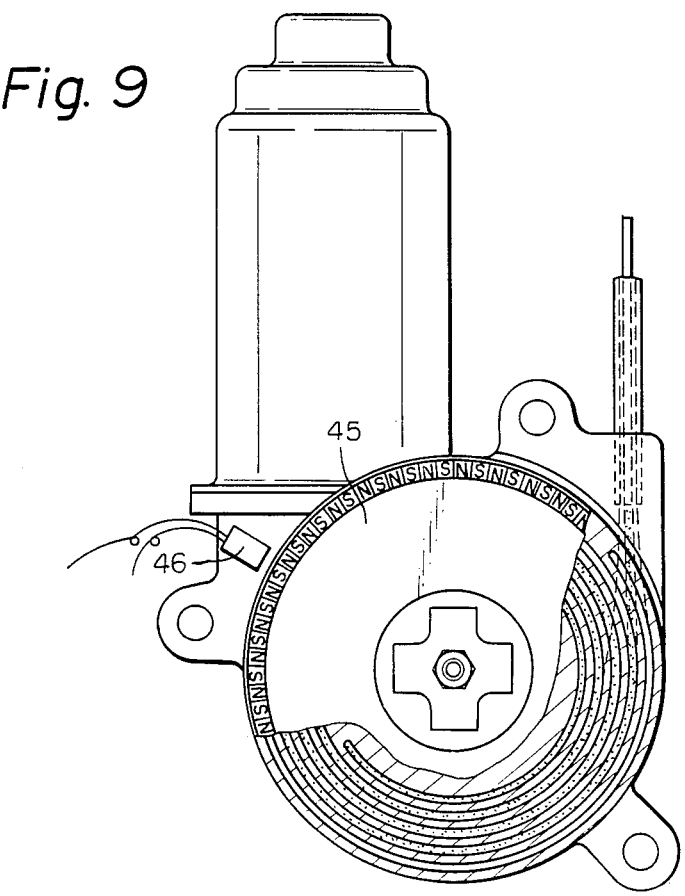
FIG. 9 is a partially external view of a principal portion of an eighth embodiment.
Figure 10:
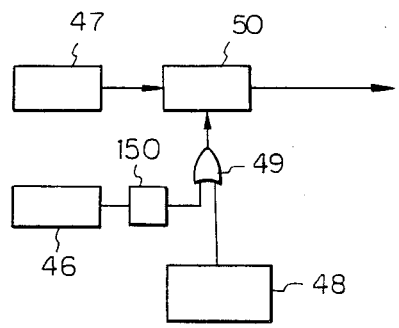
FIG. 10 is a circuit diagram of an overload detecting circuit of said embodiment.

FIGS. 9 and 10 show an example of such revolution detecting means. This embodiment utilizes the rotation of a pulley 45 for driving an anchor driving member, and also utilizes a magnetic detecting element 46.

More specifically, as shown in FIG. 9, there are provided a pulley 45 having N and S magnetic poles along the periphery and a magnetic detecting element 46 for generating pulses in response to the alternately passing magnetic poles, an overload is identified if the pulses are not generated over a predetermined period.

More specifically, as shown in FIG. 10, a counter 50 counts the pulses from an oscillator 47 until a pulse input from the magnetic detecting element 46 or the door opening/closing detection circuit 48, and an overload state is identified if said pulse input does not occur over a predetermined period. In this circuit there are provided a pulse generator 150 for generating pulses in response to the output of the magnetic detecting element 46, and an OR gate 49 for transmitting the output of the pulse generator 150 and the door opening/closing detection circuit 48 to the reset terminal of the counter 50.

Figure 11:
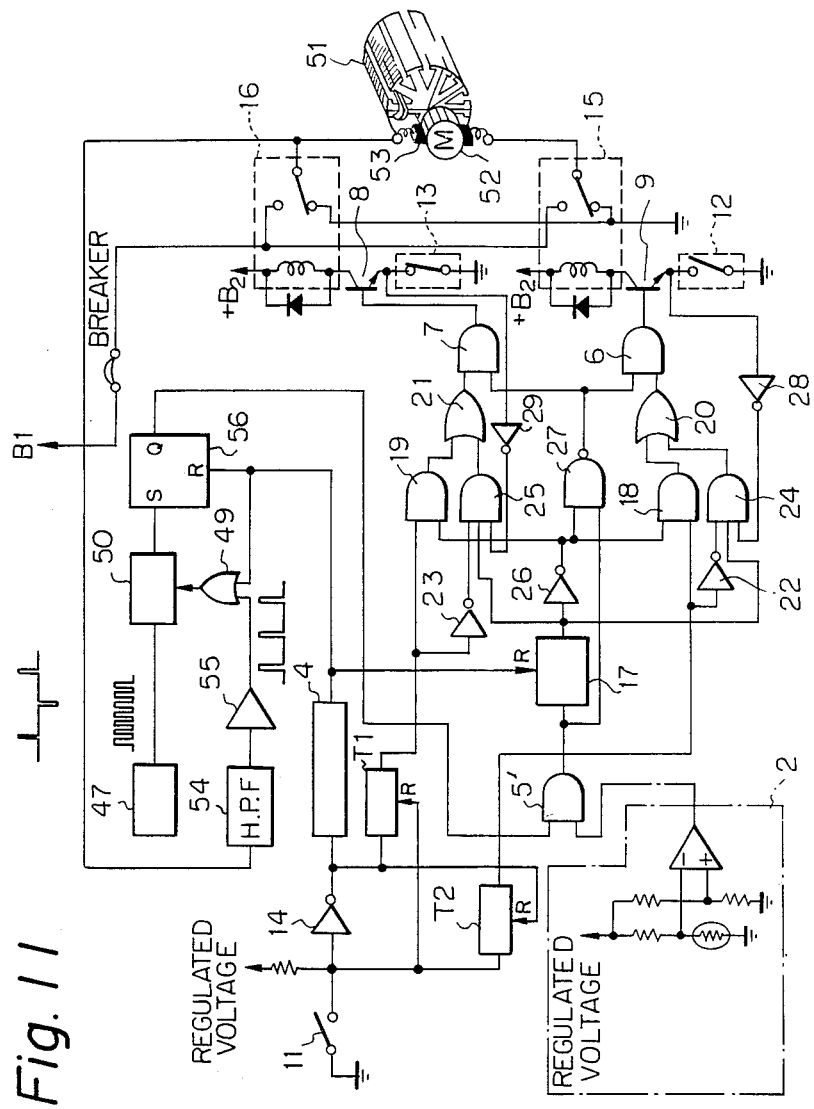
FIGS. 11 and 12 are circuit diagrams respectively showing ninth and tenth embodiments.

FIG. 11 shows a system including another embodiment of the revolution detecting means, wherein like components to those in FIG. 2 are represented by the same numbers.

A voltage change generated when the connection of rotor coils of said motor is changed between a commutator 52 and brushes 53 is taken out as the terminal voltage of said motor, and an overload state is identified if the frequency of voltage changes becomes lower than a set value.

In FIG. 11 there are shown a high-pass filter (HPF) or a band pass filter 54 for obtaining the component of said voltage change; and amplifier 55 for amplifying said component; and a flip-flop 56 for retaining a signal from the counter 50 in an overload state. The counter 50, oscillator 47 and OR gate 49 function in the same manner as in the embodiment shown in FIG. 10. Also, the function of the entire system is similar to that of the embodiment shown in FIG. 2.

Figure 12:
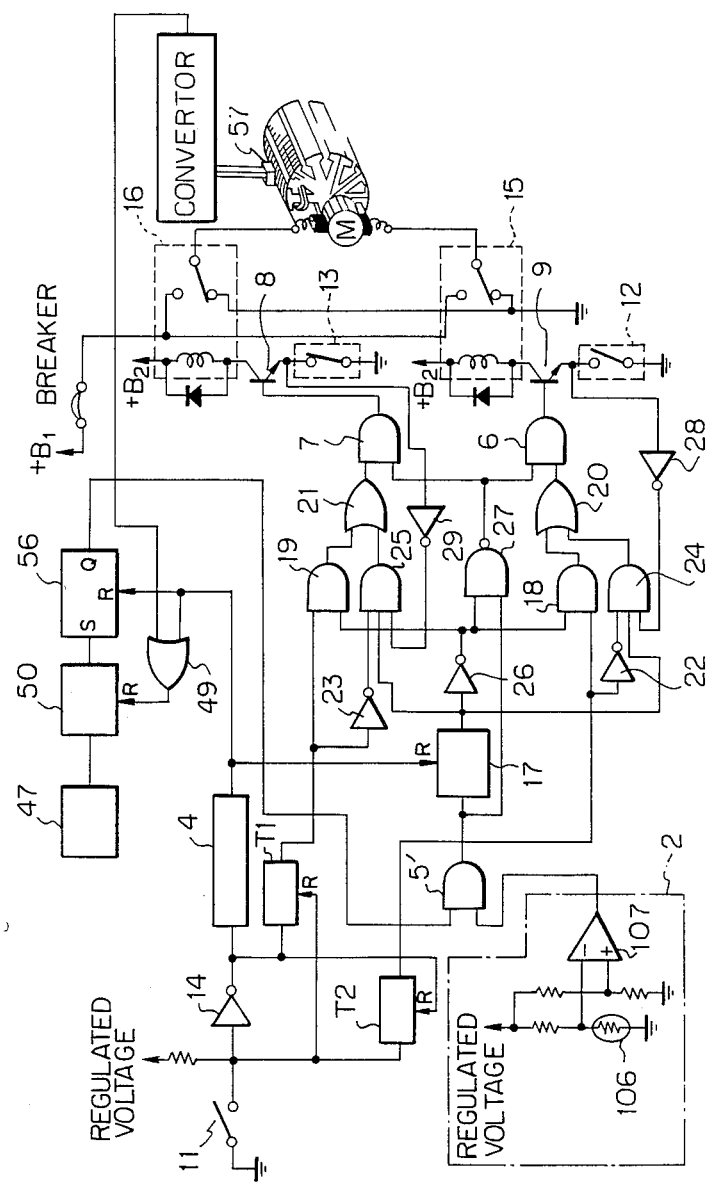

FIG. 12 shows a system including yet another embodiment of said rotation detecting means, wherein like components to those in FIG. 2 are represented by the same numbers. This embodiment employs a magnetic detecting element 57 positioned close to an armature with energized coils of said motor. Said magnetic detecting element may be composed of a Hall effect element or a magnetic resistance element, and the output thereof is supplied through a converter to an OR gate 49. Other functions are same as those in the embodiment shown in FIG. 11.

FIGS. 13A and 13B show an embodiment having an; optical detecting means 58. The aforementioned rotation detecting means is composed of a pulley 57 provided with holes, grooves or irregularities along the periphery, and optical detection means having an optical axis interrupted by said holes etc. An overload state is identified if the transmission and interruption of light is not switched over a predetermined period.

In case the detection means 58 is an electronic capacitive detection means, the system can be constructed same as the case of FIGS. 13A and 13B. The rotation detecting means is composed of a pulley 57 provided with holes, irregularities or grooves along the periphery, and capacitive detecting means 58 for detecting the changes in the capacitive caused by said holes etc., and an overload state is identified if the number of changes of capacitive within a given time is less than a set value.

FIG. 14 shows an electric circuit adapted for use in such embodiment, wherein a Schmidt trigger circuit 60 converts an analog voltage 59, representing the changes in capacitance and obtained by the detection means 58, into pulses. A pulse generator 150 generates pulses in response to the output of said Schmidt trigger circuit. Other functions are similar to those of the embodiment shown in FIG. 10.

Figure 15A:
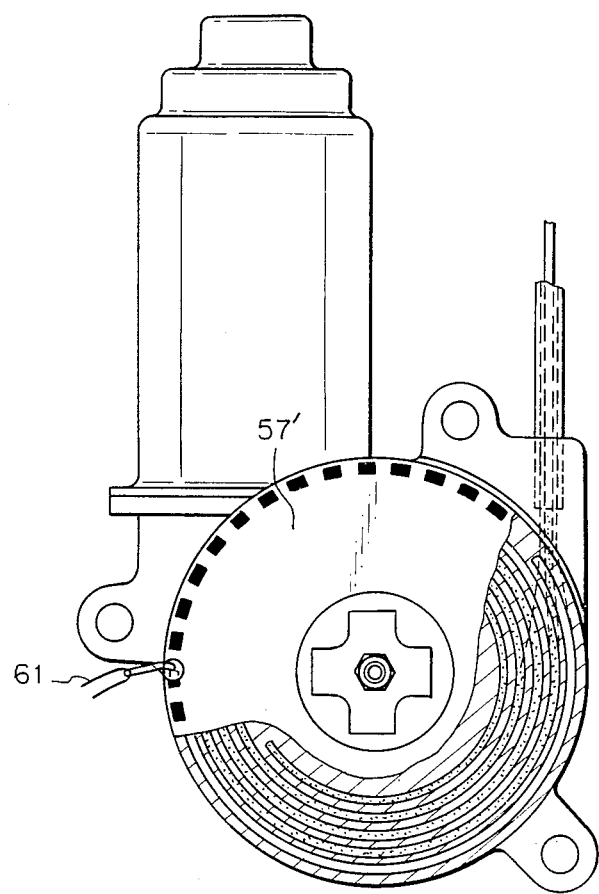
FIG. 15A is a partially cut-away external view of a principal portion of a twelfth embodiment.
Figure 15B:
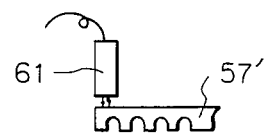
FIG. 15B is a partial plan view of a principal portion of said embodiment.

In an embodiment shown in FIGS. 15A and 15B, the rotation detecting means is provided with a pulley 57' having members of different reflectivity, holes or grooves along the periphery, and optical detection means 61 for detecting changes in light reflection, an overload state is identified if the light reflection does not change over a predetermined period.

Figure 16B:
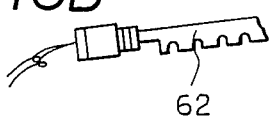
FIG. 16B is a partial plan view of a principal portion of said embodiment.
Figure 16A:
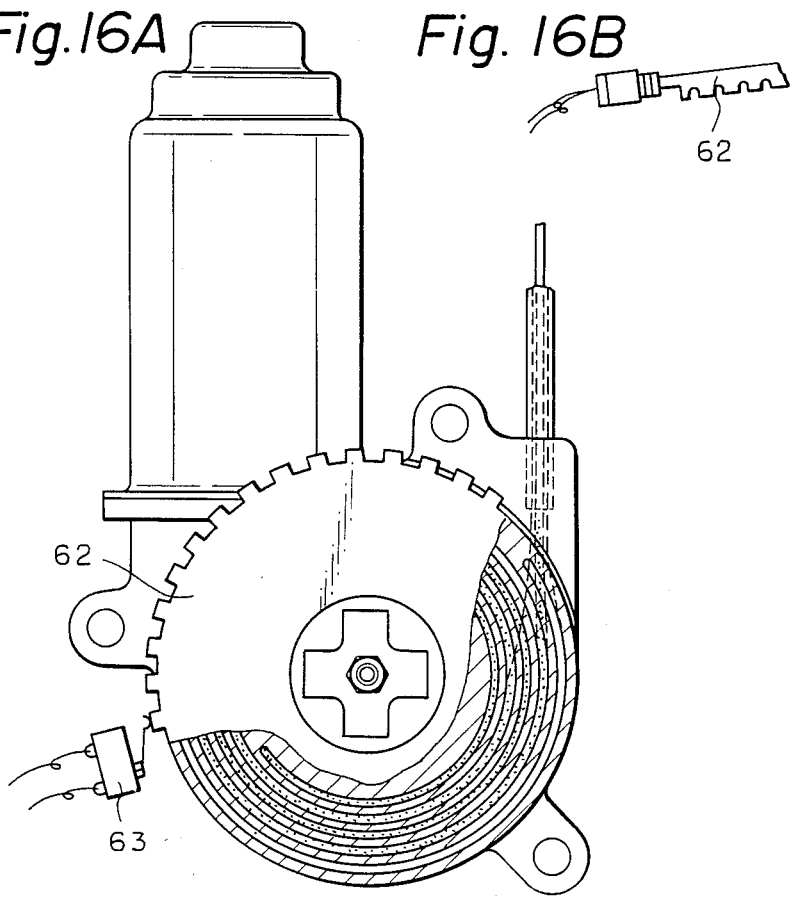
FIG. 16A is a partially cut-away external view of a principal portion of a thirteenth embodiment.
Figure 17:
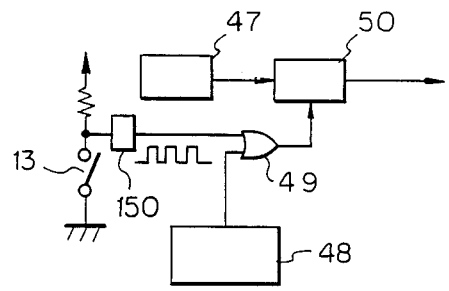
FIG. 17 is a circuit diagram of an overload detecting circuit of said embodiment.

In an embodiment shown in FIGS. 16A, 16B and 17, the rotation detecting means is composed of cam means 62 provided on an output shaft or a pulley, and a switch 63 (corresponding to the switch 13 in FIG. 17) to be actuated by said cam means an overload state is identified if the turning on or off of the switch does not occur over a predetermined period. The function of the circuit shown in FIG. 17 is same as that of the embodiment shown in FIG. 10, except for the function of the above-mentioned switch 63.

In an embodiment shown in FIGS. 18 and 19, the rotation of motor is detected by means of the output shaft thereof. The rotation detecting means is provided with an encoder 64 connected to the output shaft, and an overload state is identified if pulses are not generated by the encoder with a predetermined period. The function of the circuit shown in FIG. 19 is same as that of the embodiment shown in FIG. 10.

In an embodiment shown in FIGS. 20A, 20B and 21, the rotation detecting means has a potentiometer 65 connected to a shaft or a pulley 42C, and an overload state is identified if the change in output of said potentiometer within a predetermined time is less than a predetermined value.

More specifically, as shown in FIG. 21, the output voltage of the potentiometer 65 is differentiated by an amplifier 66, then converted into positive pulses by a circuit 67 for converting the voltage into an absolute value, and compared with a set value by a comparator 69. An overload state is identified if said set value is exceeded.

Figure 22:
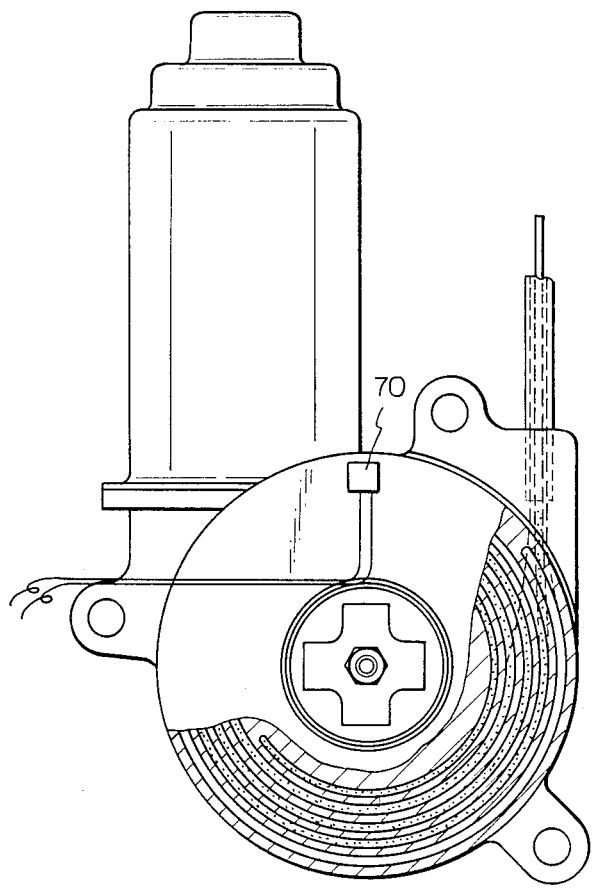
FIG. 22 is a partially cut-away external view of a principal portion of a sixteenth embodiment.
Figure 23:
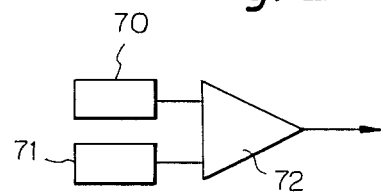
FIG. 23 is a circuit diagram of an overload detecting circuit of said embodiment.

In an embodiment shown in FIGS. 22 and 23, the rotation detecting means is provided with an acceleration detector 70 positioned in the outer periphery of the pulley, and a comparator means 72 for receiving the output of said acceleration detector and identifying an overload state if said output is smaller than a set value 71.

Also, according to another embodiment (not shown), the rotation detecting means can be composed of a centrifugal clutch and discrimination means for identifying an overload state when said clutch resets.

In the following there will be described embodiments in which the overload detecting means detects the rotary torque of a pulley or a motor, and identifies an overload state if said torque exceeds a set value.

Figure 24:
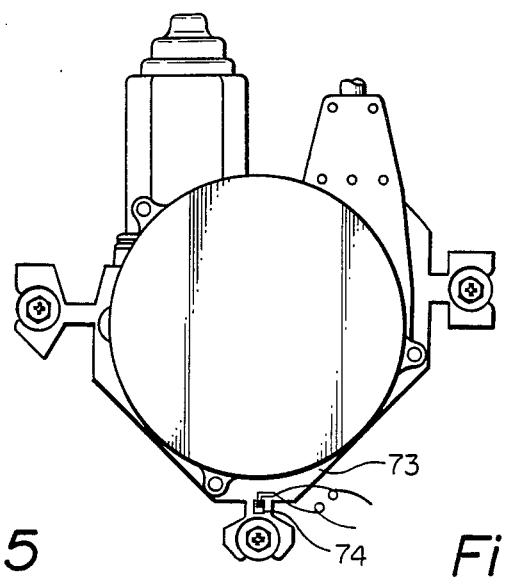
FIG. 24 is an external view of a principal portion of a seventeenth embodiment.
Figure 25:
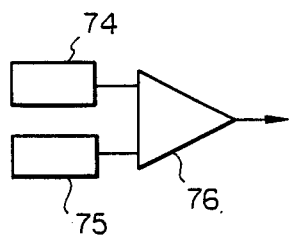
FIG. 25 is a circuit diagram of an overload detecting circuit of said embodiment.

In an embodiment shown in FIGS. 24 and 25, torque detecting means is composed of a strain detecting element 74 provided on a motor mounting plate 73, and comparator means 76 for comparing the output of said strain detecting element with a set value 75 and identifying an overload state if the former exceeds the latter.

Figure 26:
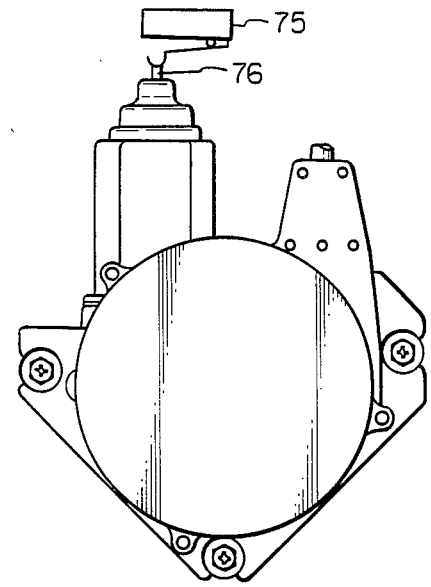
FIG. 26 is an external view of a principal portion of a eighteenth embodiment.

In an embodiment shown in FIG. 26, the torque detecting means is composed of an elastic member provided between said motor and a body of the vehicle, and displacement detecting means for detecting the displacement of said elastic member caused by the torque of the motor and identifying an overload state when said displacement exceeds a set value. In the illustrated embodiment, the displacement detecting means is composed of a limit switch 75, of which a lever is maintained in contact with a projection 76 protruding from the motor casing. In an overload state the motor rotates to right or left in the plane of drawing and, the projection 76 is shifted away from the switch 75 to turn off said switch, thereby generating an overload signal.

Figure 27:
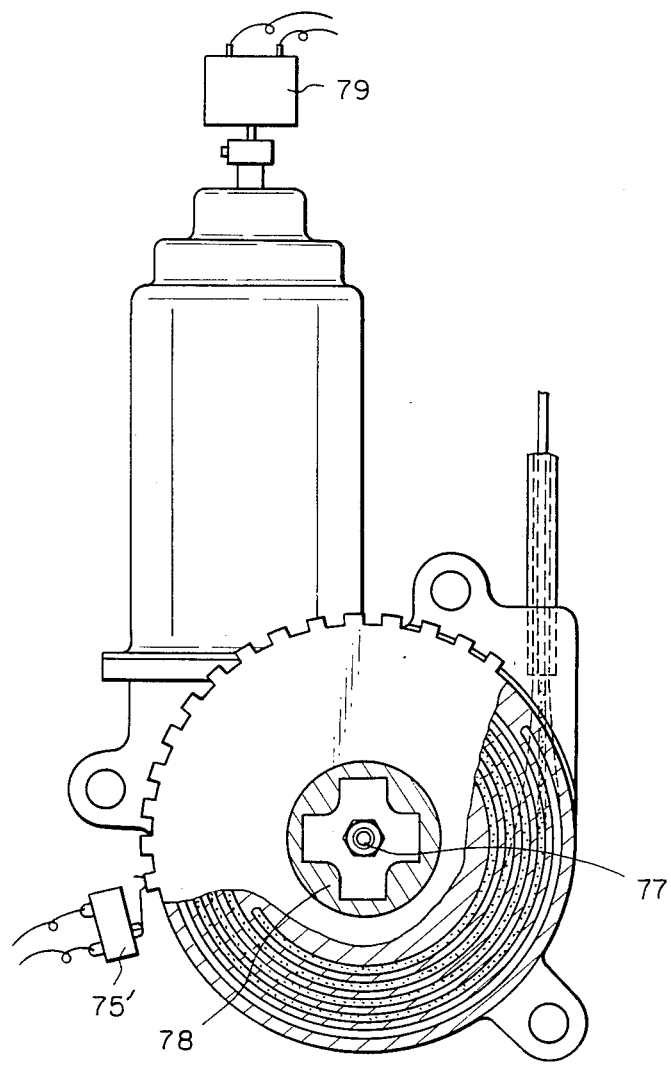
FIG. 27 is a partially cut-away external view of an nineteenth embodiment.
Figure 28:
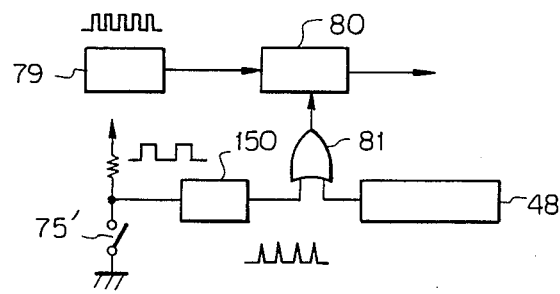
FIG. 28 is a circuit diagram showing an example of overload detecting circuit of said embodiment.

In an embodiment shown in FIGS. 27 to 29, the torque detecting means is composed of an elastic member 78 provided between a motor shaft 77 and a pulley, and displacement detecting means for detecting the amount of displacement of said elastic member, caused by the torque applied to the pulley, and identifying an overload state when said displacement exceeds a set value. In the illustrated embodiment the displacement detecting means detects the amounts of rotation of the motor shaft and the pulley, and an overload state is identified when the difference of said amounts of rotation exceeds a set amount. More specifically, notches are formed at a constant pitch on the outer periphery of the pulley, and the lever of a limit switch 75' is maintained in engagement with said notches. In an overload state, when the motor shafts rotates in excess of the set value with respect to the pulley, a counter is activated to generate an overload signal.

FIG. 28 shows an example of an electric circuit for detecting the overload in such embodiment. An encoder 79 is provided on the motor shaft. A pulse generator 150 generates a pulse at the start or end of the output of a switch 75' in response to the rotation of the pulley, and said pulse is supplied through an OR gate 81 to the reset terminal of a counter, which is reset at the start of said pulse. After said resetting, the counter 80 counts the output pulses of the encoder 79 until the next resetting pulse. In this manner the interval of the resetting pulses can be measured by the count of the encoder pulses. Thus an overload state of the motor can be identified by comparing the number of encoder pulses with that in the overload state, measured in advance. A door opening/closing detection circuit 48 is connected to the other input terminal of the OR gate 81.

Figure 29A:
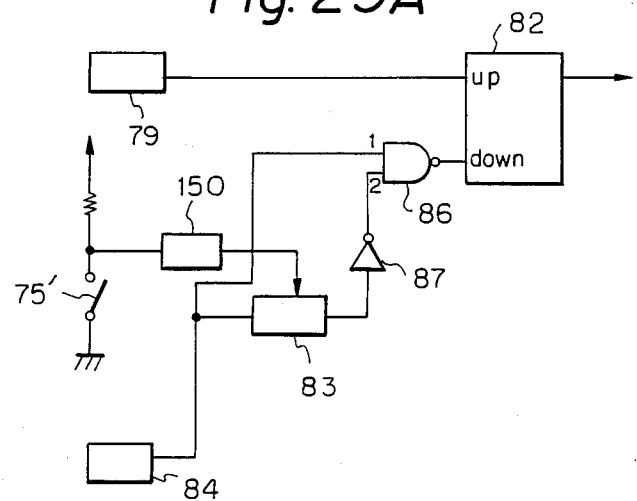
FIG. 29A is a circuit diagram showing another example of overload detecting circuit of said embodiment.
Figure 29B:
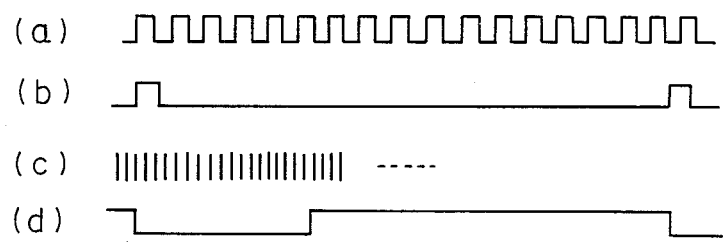
FIG. 29B is a wave form chart showing principal signals in said circuit.

FIGS. 29A and 29B show another example of the overload detecting circuit.

An up/down counter 82 counts up (increment) at each input of a pulse to an up-input terminal and counts down (decrement) at each pulse input to a down-input terminal, in mutually independent manner.

The pulses of the encoder 79 (FIG. 29B($a$)) are supplied to the up-terminal of said counter 82 and counted up therein. On the other hand, a counter 83 counts the pulses from an oscillator 84 (FIG. 29B($c$)). The reset terminal of said counter 83 is connected to a pulse generator 150 connected in turn to a limit switch 75'. When said limit switch 75' is actuated, the pulse generator 150 generates a pulse (FIG. 29B($b$)) whereby the counter 83 is reset to zero, and counts the pulses from the oscillator 84. Said counter 83 is so adjusted to complete its counting operation, corresponding to the number of actuations of the encoder determined by the gear ratio, in one cycle of the limit switch 75'.

For example, the counter output (FIG. 29B($d$)) is shifted from "0" to "1" after counting 20 pulses from the oscillator 84. In response, an inverter 87, connected to said counter 83, supplies a zero output to a NAND gate 86 to release an output signal "1" therefrom, whereby the pulses of the oscillator 84 are no longer supplied to the down-input for the up-down counter 82.

As long as the counter 83 releases a zero output, the output of the inverter 87 or the input 2 of the NAND gate 86 remains at the level "1", whereby the pulses from the oscillator 84 are transmitted, through the input terminal 1 of the NAND gate 86, to the down counter. The number of the pulses is same as that of pulses to be counted up in the counter 83, for example 20.

In this manner the counter 82 repeats up-counting and down-counting in response to the actuations of the switch 75', and releases an overload signal when the difference of the up-count and down-count exceeds a predetermined value.

In an embodiment shown in FIGS. 30A, 30B and 31, the overload detecting means detects the movement or speed of a driving member, and identifies an overload state when said movement or speed does not reach a set value. Said detecting means is provided with a drive member 89 having holes, grooves or areas of different reflection in the longitudinal direction, and light detecting means having a light axis intercepted by said holes, grooves or areas of different reflection. An overload state is identified if the light transmission or reflection does not change over a predetermined period. Said light detecting means can be composed, for example, of a light-emitting diode 90a and a phototransistor 90b. An electric circuit shown in FIG. 31 is similar to that shown in FIG. 10, except the presence of the LED 90a and phototransistor 90b explained above.

Figure 32:
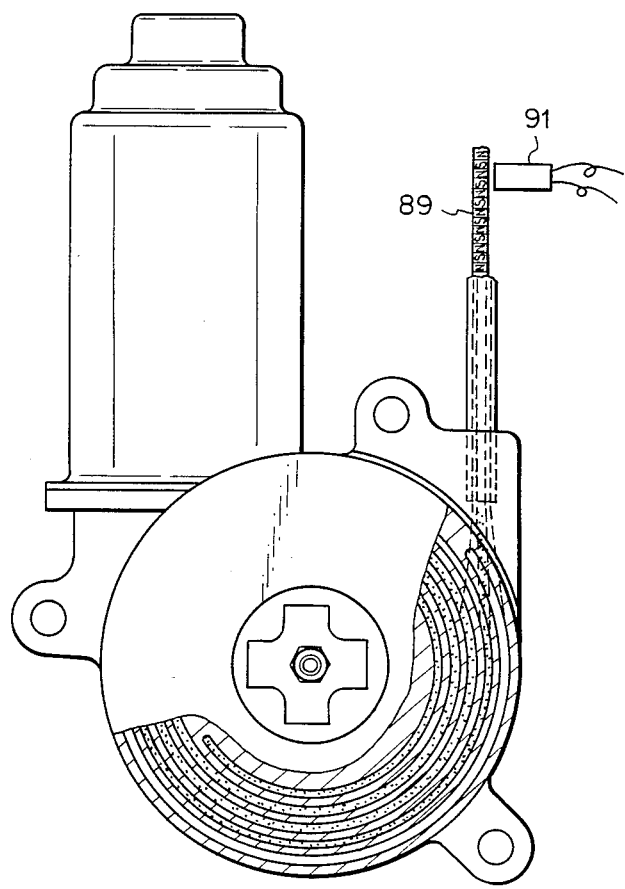
FIG. 32 is a partially cut-away external view of a principal portion of a twenty first embodiment.

In an embodiment shown in FIG. 32, said detecting means for detecting the movement of drive member is composed of a drive member 89 having N and S magnetic poles alternately in the longitudinal direction, and a magnetic detecting element 91 capable generating pulses in response to changes in the magnetic field. An overload state is identified if no pulse is received from said element over a predetermined period.

The passive seat belt system of the present invention, explained in the foregoing, provides a number of important advantages.

For example, as one of its most important advantages, in an overload state of the motor caused by a trouble in the movement of the anchor, the present invention stops the motor upon detecting said overload state, thereby ensuring safe movement of the seat belt, preventing the continued locked rotor current in the motor and thus protecting the motor.

The present invention is not limited to the foregoing embodiments but is subject to various modifications and alterations within the scope and spirit of the appended claims.

What we claim is:

1. A passive seat belt system for automatic fastening or unfastening of a seat belt in response to the boarding or alighting of a vehicle occupant, comprising:
    overload detecting means for detecting the presence of an overload in the movement of a movable anchor of said seat belt, and
    control means for reversing and then stopping a drive motor for said movable anchor in response to the detection of an overload in the movement of said movable anchor by said overload detecting means.

2. A passive seat belt system according to claim 1, further comprising means for detecting ambient temperature, wherein said control means is disabled when the temperature detected by said ambient temperature detecting means is below a predetermined temperature.

3. A passive seat belt system according to claim 2, wherein said overload detecting means comprises overcurrent control means for detecting a current in said motor.

4. A passive seat belt system according to claim 2 wherein said overload detecting means includes temperature rise rate detecting means for detecting the temperature rise rate of said motor and identifying an overload state when said temperature rise rate exceeds a set value.

5. A passive seat belt system according to claim 2, wherein said overload detecting means comprises rotation detecting means for detecting rotation or speed of said motor and identifying an overload state when said rotation or speed becomes lower than a set value.

6. A passive seat belt system according to claim 1, wherein said control means comprises a timer circuit and is adapted, after the detection of said overload by said overload detecting means, to reverse said motor for a period determined by said timer circuit, and thereafter to stop said motor.

7. A passive seat belt system according to claim 1, wherein said control means is adapted to reverse said motor after the detection of said overload by said overload detecting means, and to stop said motor when said overload detecting means detects that the overload in the movement of said anchor is relieved.

8. A passive seat belt system according to claim 1, wherein said control means does no not reverse said motor when said anchor of said seat belt has reached a rear end in the backward movement thereof and has actuated a rear switch.

9. A passive seat belt system according to claim 1, wherein said control means does not reverse said motor when said anchor of said seat belt has reached a front end in the forward movement thereof and has actuated a front switch.

10. A passive seat belt system according to claim 1, wherein said overload detecting means comprises overcurrent control means for detecting a current in said motor.

11. A passive seat belt system according to claim 1, wherein said overload detecting means includes temperature rise rate detecting means for detecting the temperature rise rate of said motor and identifying an overload state when said temperature rise rate exceeds a set value.

12. A passive seat belt system according to claim 11, wherein said temperature rise rate detecting means comprises a thermistor.

13. A passive seat belt system according to claim 11, wherein the set value of said temperature rise rate is variable in dependence upon the temperature detected by said ambient temperature detecting means.

14. A passive seat belt system according to claim 11, wherein the set value of said temperature rise rate is determined in dependence upon a power supply voltage.

15. A passive seat belt system according to claim 1, wherein said overload detecting means comprises rotation detecting means for detecting rotation or speed of said motor and identifying an overload state when said rotation or speed becomes lower than a set value.

16. A passive seat belt system for automatic fastening or unfastening of a seat belt in response to the boarding or alighting of a vehicle occupant, comprising:
    overload detecting means for detecting the presence of an overload in the movement of a movable anchor of said seat belt, and
    control means for stopping a drive motor for said movable anchor in response to the detection of an overload in the movement of said movable anchor by said overload detecting means,
    said overload detecting means including rotation detecting means adapted to detect voltage changes generated at the change-over of connections of rotor coils of said motor between a commutator and brushes thereof for detecting rotation of said motor, and to identify an overload state when the frequency of said voltage changes becomes lower than a set value.

17. A passive seat belt system for automatic fastening or unfastening of a seat belt in response to the boarding or alighting of a vehicle occupant, comprising:
    overload detecting means for detecting the presence of an overload in the movement of a movable anchor of said seat belt, and control means for stopping a drive motor for said movable anchor in response to the detection of an overload in the movement of said movable anchor by said overload detecting means, said overload detecting means including rotation detecting means adapted to detect the rotation of said motor from one of an output shaft of said motor and a pulley for a drive member for said anchor of said seat belt, and to identify an overload state when the rotation of said motor becomes lower than a set value.

18. A passive seat belt system according to claim 17, wherein said rotation detecting means detects rotation of said motor magnetically.

19. A passive seat belt system according to claim 18, wherein said rotation detecting means is comprises a magnetic detecting element positioned close to an armature of said motor.

20. A passive seat belt system according to claim 18, wherein said rotation detecting means comprises a pulley having N and S magnetic poles arranged alternately along the periphery thereof, a magnetic detecting element positioned near said pulley for generating pulses in response to magnetic field changes due to rotation of said pulley, and means for receiving the pulses from said magnetic detecting element and identifying an overload state when a pulse is not received for a predetermined period.

21. A passive seat belt system according to claim 17, wherein said rotation detecting means detects rotation of said motor optically.

22. A passive seat belt system according to claim 21, wherein said rotation detecting means comprises a pulley having holes, grooves or irregularities along a periphery thereof, optical detecting means having an optical axis intercepted by said holes, grooves or irregularities, and means responsive to said optical detecting means for identifying an overload state when the transmission or interception of light by said holes, grooves or irregularities does not change over a predetermined period.

23. A passive seat belt system according to claim 21, wherein said rotation detecting means comprises a pulley having members of different reflectivity, holes or grooves at a constant pitch along a periphery thereof, optical detecting means for detecting changes in light reflection by said periphery due to rotation of said pulley, and means responsive to said optical detecting means for identifying an overload state when the reflection does not change over a predetermined period.

24. A passive seat belt system according to claim 17, wherein said rotation detecting means comprises cam means provided on said output shaft or said pulley, a switch actuated by said cam means, and means for identifying an overload state in the absence of actuation of said switch.

25. A passive seat belt system according to claim 17, wherein said rotation detecting means comprises an encoder connected to said output shaft or said pulley, and means for identifying an overload state when the encoder does not generate pulses over a predetermined period.

26. A passive seat belt system according to claim 17, wherein said rotation detecting means comprises a potentiometer connected to said output shaft or said pulley, and means for identifying an overload state when change in output of said potentiometer in a given time is less than a set value.

27. A passive seat belt system according to claim 17, wherein said rotation detecting means comprises a pulley having holes, irregularities or grooves along the periphery thereof, electrical capacitance sensing means positioned near said periphery for sensing changes in electric capacitance when said holes, irregularities or grooves pass thereby during rotation of that pulley, and means for identifying an overload state when the number of changes in electric capacitance sensed by said sensing means in a predetermined period of time is less then a set value.

28. A passive seat belt system according to claim 17, wherein said rotation detecting means comprises an acceleration detector positioned close to the outer periphery of said pulley for detecting acceleration of said pulley, and comparator means for receiving an output of said acceleration detector and identifying an overload state when said output is less than a set value.

29. A passive seat belt system according to claim 17, wherein said rotation detecting means comprises a centrifugal clutch, and means for identifying an overload state when said centrifugal clutch resets.

30. A passive seat belt system for automatic fastening or unfastening of a seat belt in response to the boarding or alighting of a vehicle occupant, comprising:

overload detecting means for detecting the presence of an overload in the movement of a movable anchor of said seat belt, and control means for stopping a drive motor for said movable anchor in response to the detection of an overload in the movement of said movable anchor by said overload detecting means, said overload detecting means including torque detecting means for detecting the rotary torque of a pulley or said motor and identifying an overload state when said torque exceeds a set value.

31. A passive seat belt system according to claim 30, wherein said torque detecting means comprises a strain detecting element provided on a mounting plate for said motor, and comparator means for comparing the output of said strain detecting element with a set value and identifying an overload state when the output of said strain detecting element exceeds said set value.

32. A passive seat belt system according to claim 30, wherein said torque detecting means comprises an elastic member provided between said motor and a body of a vehicle, and displacement detecting means for detecting displacement of said elastic member caused by the torque of said motor and identifying an overload state when said displacement exceeds a set value.

33. A passive seat belt system according to claim 30, wherein said torque detecting means comprises an elastic member provided between the output shaft of said motor and a pulley and displacement detecting means for detecting displacement of said elastic member due to torque applied to said pulley and identifying an overload state when said displacement exceeds a set value.

34. A passive seat belt system according to claim 33, wherein said displacement detecting means detects the amounts of rotation of said motor output shaft and said pulley and identifies an overload state when the difference between of said amounts of rotation exceeds a set value.

35. A passive seat belt system according to claim 30, further comprising means for detecting ambient temperature, and wherein said control means is disabled when the temperature detected by said ambient temperature detecting means is below a predetermined temperature.

36. A passive seat belt system for automatic fastening or unfastening of a seat belt in response to the boarding or alighting of a vehicle occupant, comprising:
   overload detecting means for detecting the presence of an overload in the movement of a movable anchor of said seat belt, and
   control means for stopping a drive motor for said movable anchor in response to the detection of an overload in the movement of said movable anchor by said overload detecting means,
   said overload detecting means including means for detecting one of movement and speed of a drive member for said movable anchor and identifying an overload state when said one of movement and speed of said drive member is less than a set value.

37. A passive seat belt system according to claim 36, wherein said means for detecting one of movement and speed of said drive member comprises holes, grooves or areas of different reflectance arranged at a predetermined pitch in the longitudinal direction of said drive member, optical detecting means having an optical axis intercepted by said holes, grooves or areas, and means for identifying an overload state when the transmission, interception or reflection of light by said holes, grooves or areas does not change over a predetermined period.

38. A passive seat belt system according to claim 36, wherein said means for detecting one of movement and speed of said drive member comprises N and S magic poles arranged at a predetermined pitch in the longitudinal direction of said drive member, a magnetic detecting element positioned near said drive member for generating pulses in response to magnetic field changes due to longitudinal movement of said drive member, and means for receiving the pulses from said magnetic detecting element and identifying an overload state when a pulse from said detecting element is not received over a predetermined period.

39. A passive seat belt system according to claim 36, further comprising means for detecting ambient temperature, and wherein said control means is disabled when the temperature detected by said ambient temperature detecting means is below a predetermined temperature.

40. A passive seat belt system for automatic fastening or unfastening of a seat belt in response to the boarding or alighting of a vehicle occupant, comprising:
   overload detecting means for detecting the presence of an overload in the movement of a movable anchor of said seat belt, and
   control means for reversing and then stopping a drive motor for said movable anchor in response to the detection of an overload in the movement of said movable anchor by said overload detecting means,
   said overload detecting means comprising overcurrent detecting means, including converter means for converting the current in said motor into a voltage, set value determining means for determining a set value in dependence upon a power supply voltage, and comparator means for comparing the voltage from said converter means with a set voltage from said set value determining means and producing an overload signal when the voltage from said converter means exceeds said set voltage.

41. A passive seat belt system according to claim 40, wherein said converter means comprises a circuit breaker provided in a circuit for current supply to said motor, and said converter means obtains the current in said motor from the terminal voltage of said circuit breaker.

42. A passive seat belt system according to claim 40, wherein said converter means is adapted to obtain the current in said motor from a terminal voltage across said motor.

43. A passive seat belt system according to claim 40, wherein said converter means obtains the current in said motor from a voltage drop in a circuit from a power supply source to the motor terminals.

44. A passive seat belt system according to claim 40, wherein said converter means comprises a Hall effect element positioned close to a current supply circuit for said motor, for detecting the current in said motor.

* * * * *